(12) United States Patent
Pogosyan et al.

(10) Patent No.: US 10,678,654 B2
(45) Date of Patent: Jun. 9, 2020

(54) SYSTEMS AND METHODS FOR DATA BACKUP USING DATA BINNING AND DEDUPLICATION

(71) Applicant: Acronis International GmbH, Schaffhausen (CH)

(72) Inventors: Vitaly Pogosyan, Moscow (RU); Kirill Korotaev, Moscow (RU); Mark Shmulevich, Moscow (RU); Stanislav Protasov, Moscow (RU); Serguei M. Beloussov, Costa del Sol (SG)

(73) Assignee: Acronis International GmbH, Schaffhausen (CH)

( * ) Notice: Subject to any disclaimer, the term of this patent is extended or adjusted under 35 U.S.C. 154(b) by 279 days.

(21) Appl. No.: 15/793,188

(22) Filed: Oct. 25, 2017

(65) Prior Publication Data
US 2018/0113767 A1    Apr. 26, 2018

Related U.S. Application Data

(60) Provisional application No. 62/412,910, filed on Oct. 26, 2016.

(51) Int. Cl.
*G06F 11/14*     (2006.01)
*G06F 16/901*    (2019.01)
*G06F 16/22*     (2019.01)
*G06F 16/27*     (2019.01)

(52) U.S. Cl.
CPC .......... *G06F 11/1453* (2013.01); *G06F 16/22* (2019.01); *G06F 16/27* (2019.01); *G06F 16/9014* (2019.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 8,914,338 | B1* | 12/2014 | Wallace | G06F 3/0683 707/693 |
| 9,875,183 | B2* | 1/2018 | Czerkowicz | G06F 12/08 |
| 2011/0066628 | A1* | 3/2011 | Jayaraman | G06F 16/1748 707/758 |
| 2015/0127621 | A1* | 5/2015 | Kuo | G06F 3/061 707/692 |

(Continued)

*Primary Examiner* — Richard L Bowen
(74) *Attorney, Agent, or Firm* — Arent Fox LLP; Michael Fainberg (57) ABSTRACT

Disclosed are methods and systems for performing data backup which implement data binning using log-structured merge (LSM) trees during deduplication. An exemplary method includes: calculating a reduced hash value (RHV) associated with each of a plurality of data blocks; partitioning the plurality of reduced hash values into groups; selecting a representative hash value for each group; determining whether the representative hash value occurs in a first LSM tree, the first LSM tree stored in a volatile memory; and when the representative hash value occurs in the first LSM tree: loading the RHVs in the representative hash value's group into volatile memory; comparing each of the RHVs to one or more hash values in a second LSM tree to identify a matching hash value; and writing a segment identifier (ID) corresponding to the matching hash value in an archive, which references a data block in a segment store.

20 Claims, 5 Drawing Sheets

(56) References Cited

U.S. PATENT DOCUMENTS

2017/0262465 A1* 9/2017 Goggin ............... H04L 67/1097
2017/0364414 A1* 12/2017 Pogosyan ........... G06F 11/1453
2018/0018235 A1* 1/2018 Arslan ................ G06F 11/1453

* cited by examiner

SYSTEMS AND METHODS FOR DATA BACKUP USING DATA BINNING AND DEDUPLICATION

CROSS-REFERENCE TO RELATED APPLICATION

The application claims priority to U.S. Provisional Patent Application No. 62/412,910, which was filed on Oct. 26, 2016, the contents of which is incorporated herein by reference.

TECHNICAL FIELD

The disclosure generally relates to the field of data backup and recovery, and more specifically to the systems and methods for performing data backup and recovery which implement data binning using log-structured merge trees during deduplication.

BACKGROUND

Modern corporate enterprises have large volumes of critical data, such as work-related documents, emails, financial records, etc., that must be backed up to prevent data loss due to accidents, malware and disasters which may destroy or corrupt the original data. During the typical backup process, data stored on client workstations and servers is sent to a local or remote backup storage. During recovery procedure, backup data is retrieved from the backup storage and reconstructed on client workstations and servers. The amount of data that requires backup can be quite large for a large or medium-sized company (e.g., measured in hundreds of terabytes), and so the backup process can be very resource intensive and time consuming. Furthermore, given that data backup has to be performed frequently, e.g., daily, semi-weekly, the backup process can be quite onerous on the corporate network.

In order to increase efficiency, backup systems may employ data deduplication. Data deduplication refers to compression techniques that reduce the amount of duplicate data (e.g., a same bit sequence or byte sequence) in a dataset. As part of the deduplication process, unique data is identified and stored. For example, as new data is received, a backup system may determine whether the incoming data matches data that has previously been stored. If the new data is found to match the stored data, a reference (e.g., a pointer) may be used for the incoming data, indicating that the data is available at the previously stored location and avoiding the need for a duplicate copy of the same data to be stored. Alternatively, if the incoming data does not match any previously stored data, the incoming data may be stored. This process may then be repeated for additional incoming data.

In some implementations, data may be stored as data blocks which are associated with a unique identifier (ID) and these IDs may be indexed. Different approaches to indexing may be employed to determine whether a new data block matches a stored data block. However, the process of determining whether a new data block matches a stored data block incurs overhead (time, system resources, etc.). This overhead may be particularly onerous when a search is performed on disk instead of in volatile memory (e.g., RAM) due to slower read speeds. While it would be preferable in many cases to implement the indexing function in volatile memory, this option is unavailable if the dataset is too large and/or if the amount of volatile memory is insufficient on a given system.

Therefore, there exists a need for data storage and recovery methods that implement reduce the overhead associated with searching for duplicate data blocks and adding new data blocks. More specifically, there exists a needs for methods of this type which are suitable for prohibitively large datasets and/or on systems that have a relatively limited amount of volatile memory (e.g., slow or old servers).

BRIEF SUMMARY

Disclosed are methods for data backup using data binning and deduplication which reduce the resource overhead, particularly memory requirements, associated with current data backup methods that rely upon deduplication techniques. Further advantages will be readily apparent in light of the full disclosure. In one exemplary aspect, a method comprises: calculating, by a processor, a reduced hash value associated with each of a plurality of data blocks; partitioning, by the processor, the plurality of reduced hash values into groups; selecting, by the processor, a representative hash value for each group; determining, by the processor, whether the representative hash value occurs in a first log-structured merge (LSM) tree, the first LSM tree stored in a volatile memory; and when the representative hash value occurs in the first LSM tree: loading the reduced hash values in the representative hash value's group into the volatile memory; comparing each of the reduced hash values to one or more hash values in a second LSM tree to identify a matching hash value; and writing a segment identifier (ID) corresponding to the matching hash value in an archive, the segment ID referencing a data block in a segment store.

In another aspect, the representative hash value for each group is selected from the plurality of reduced hash values assigned to the group.

In another aspect, the segment ID is generated by incrementing a previous segment ID.

In another aspect, the method further comprises identifying the segment ID based on the determination that the representative hash value occurs in the first LSM tree, wherein the one or more reduced hash values in the second LSM tree are each associated with the segment ID.

In another aspect, calculating the reduced hash value comprises selecting a plurality of bits at a beginning of a first hash value as the reduced hash value.

In another aspect, the second LSM tree is stored in non-volatile memory.

In another exemplary aspect, a system for data backup is provided comprising: one or more hardware or virtual processors configured to: calculate, for each of a plurality of data blocks, a reduced hash value associated with each of the data blocks; partition, by the processor, the plurality of reduced hash values into groups; select, by the processor, a representative hash value for each group; determine, by the processor, whether the representative hash value occurs in a first LSM tree, the first LSM tree stored in a volatile memory; and when the representative hash value occurs in the first LSM tree: load the reduced hash values in the representative hash value's group into the volatile memory; compare each of the reduced hash values to one or more hash values in a second LSM tree to identify a matching hash value; and write a segment ID corresponding to the matching hash value in an archive, the segment ID referencing a data block in a segment store.

In another aspect, the system includes one or more hardware or virtual processors configured to perform any of the methods disclosed herein.

In another aspect, a non-transitory computer readable medium comprising computer executable instructions for data backup is provided, including instructions for: calculating, for each of a plurality of data blocks, a reduced hash value associated with each of the data blocks; partitioning, by the processor, the plurality of reduced hash values into groups; selecting, by the processor, a representative hash value for each group; determining, by the processor, whether the representative hash value occurs in a first LSM tree, the first LSM tree stored in a volatile memory; and when the representative hash value occurs in the first LSM tree: loading the reduced hash values in the representative hash value's group into the volatile memory; comparing each of the reduced hash values to one or more hash values in a second LSM tree to identify a matching hash value; and writing a segment ID corresponding to the matching hash value in an archive, the segment ID referencing a data block in a segment store.

In another aspect, the non-transitory computer readable medium includes instructions for performing any of the methods disclosed herein.

The above simplified summary of exemplary aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the disclosure that follows. To the accomplishment of the foregoing, the one or more aspects of the disclosure include the features described and particularly pointed out in the claims. Moreover, it is understood that the individual limitations of elements of any of the disclosed methods, systems and software products may be combined to generate still further aspects without departing from the spirit of the present disclosure and the inventive concepts described herein.

BRIEF DESCRIPTION OF THE DRAWINGS

The accompanying drawings, which are incorporated into and constitute a part of this specification, illustrate one or more example aspects of the disclosure and, together with the detailed description, serve to explain their principles and implementations.

DETAILED DESCRIPTION

Exemplary aspects of the present disclosure are described herein in the context of systems, methods and non-transitory computer readable media comprising computer executable instructions for performing data backup and recovery which implement data binning (e.g., using log-structured merge trees) and deduplication. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the exemplary aspects as illustrated in the accompanying drawings. The same reference indicators will be used to the extent possible throughout the drawings and the following description to refer to the same items. In addition, this presently disclosed methods and systems may incorporate any aspect of the data backup methods disclosed in co-pending U.S. Provisional Application No. 62/351,388, the entire contents of which is incorporated herein by reference.

An LSM tree may comprise a cascade of trees, wherein each tree $C_x$ has a target size $|C_x|$, organized such that the target size increases at an exponential rate (e.g., target size $|C_{x+1}|=10|C_x|$. In some implementations of an LSM tree, elements are inserted into the smallest tree available (e.g., $C_x$) and when this tree becomes full the contents are flushed into a larger tree (e.g., $C_{x+1}$). An LSM tree more may comprise any number of such levels. To illustrate this point, in some aspects an LSM tree may be a data structure having at least two levels (e.g., $C_0$ and $C_1$). New records may be inserted into a first level (e.g., $C_0$) and when insertion causes that first level to exceed a threshold, one or more records may be moved from the first level to a second level (e.g., $C_1$). An LSM tree may be used as an index for data storage and backup, particularly in the context of data deduplication.

A single LSM tree may offer quick addition of new data, but may not offer a quick search for existing data. However, searching efficiency may be improved, e.g., by implementing caching, bloom filters and/or fractional cascading. For example, one or more of the trees that form an LSM (e.g., the smallest tree or a plurality of small trees) may be cached to reduce the performance cost of search operations. Bloom filters may be implemented to avoid search queries for elements that are not stored in a given tree.

In one example aspect, a backup system as described herein may employ at least two sets of LSM trees. The at least two LSM trees may offer the quick addition of new data and, additionally, may reduce the time consumed searching for data that is already archived. Such an approach may reduce the time consumed by a deduplication process during backup, for example, by reducing the number of read and/or write operations on disk. In one example aspect, at least one of the LSM trees may be stored in volatile memory (e.g., random-access memory) to reduce the time consumed by searching the LSM tree. Further, sequential identifiers (IDs) may be assigned to adjacent data blocks (e.g., "data locality"), which may reduce the number of random disk accesses in a search for a matching data block.

Figure 1A:
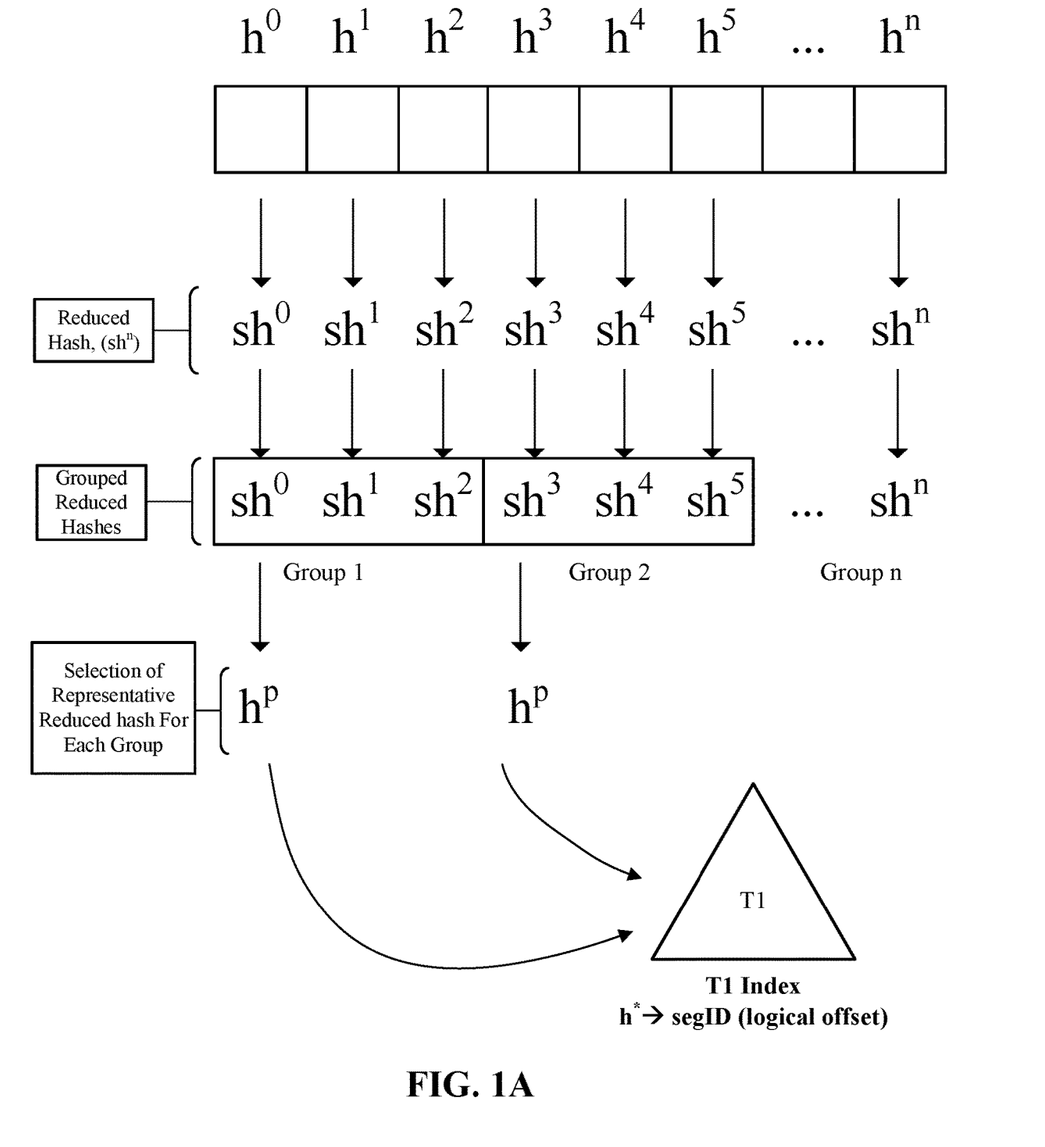
FIG. 1A is a block diagram illustrating a process for binning a set of hash values associated with a plurality of data blocks, by calculating a reduced hash value for each data block, grouping the reduced hash values, and selecting a representative hash value for each group.

FIG. 1A depicts an exemplary method for binning hash values associated with a plurality of data blocks. A backup system may receive data and divide that data into data blocks (e.g., "chunking"). The backup system may then calculate a unique identifier, such as a cryptographic signature or hash, for each data block or for subsets of data blocks. In one exemplary aspect, the backup system may use a SHA-1 method to calculate a hash. This identifier may be any arbitrary length as selected for a given implementation, e.g., each hash may be 32, 64, 128, 256, 512, or 1024 bits. In another aspect, the backup system may use a SHA-256 method to calculate a hash. In this case, each hash 102 may be, e.g., 32 bytes.

The hash assigned to each data block may in turn be used to generate a second hash, (e.g., a "reduced hash" value). For example, a plurality of bits at the beginning of the hash value may be selected as the reduced hash value. Other hashing algorithms or techniques may be used. In one example aspect, the reduced hash value will be shorter in size, e.g., to allow faster processing and/or to reduce memory requirements. In one example aspect, the reduced hash values may be grouped into bins, as illustrated by FIG. 1A. After binning, at least one reduced hash from each bin may be selected as a representative for the bin. Selection of a representative reduced hash for each bin is useful for many applications, as it allows for a reduced memory footprint.

In one example aspect, a reduced hash is not calculated and the initial hash is binned. In these implementations, a representative hash may instead be selected from the binned hash values and used in place of the representative reduced hash in the subsequent steps of the method. However, as noted in the preceding paragraph, the use of a reduced hash may be preferable for some implementations because of the smaller memory footprint.

Figure 1B:
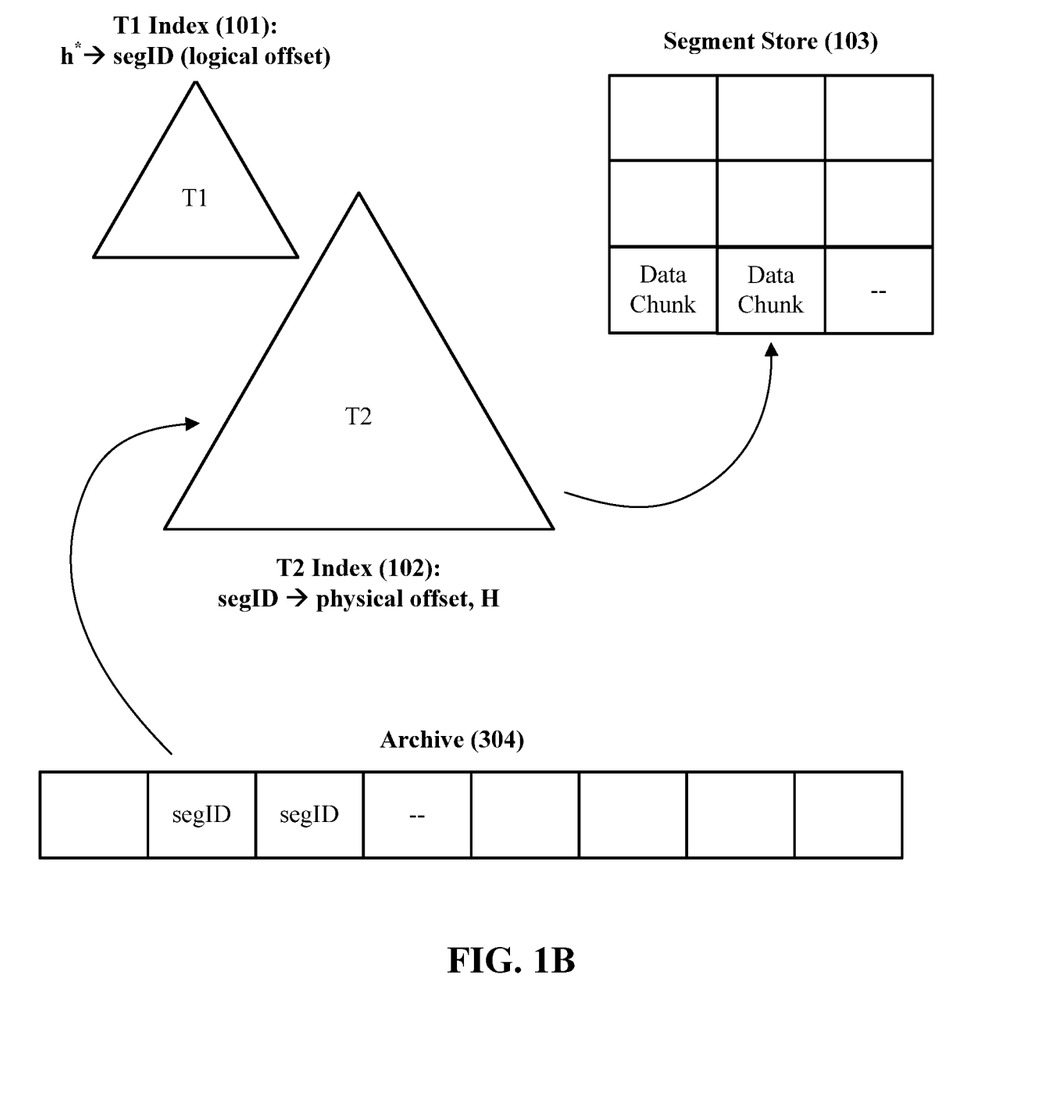
FIG. 1B is a block diagram illustrating the use of LSM trees in a general exemplary aspect of the presently disclosed data backup methods.

As illustrated by FIG. 1B, the selected representative reduced hash (or representative hash, if no reduced hash is calculated) may then be checked against the indexed hashes in a first LSM to determine if the representative reduced hash corresponds to a new data block that has not been indexed ("T1"); if so, the remaining reduced hashes in the same bin as the representative reduced hash may then be loaded into memory for indexing of the new data blocks to be stored in the archive. By limiting the initial comparison to only the representative reduced value, the first LSM tree is able to function with a reduced memory footprint because the remaining reduced hash values in the representative's bin do not need to be loaded into memory unless necessary (e.g., after the representative hash value is determined to be in the first LSM).

The backup system may check a new representative reduced hash against the indexed hashes in the T1 LSM to determine if a new data block is unique. If the new data block is unique, the new representative reduced hash, and the reduced hashes of other data blocks in the same bin, are added to the indexed hashes. Further, the backup system adds the new data block to storage and determines an offset of the new data block in the storage (e.g., an offset from a beginning address of an archive file). The offset may be 8 bytes. The index table may increase in size as new data blocks are added to the index by the backup system. The index table may be part of an LSM tree used for indexing data blocks. Aspects described herein may use at least two LSM trees, each of which may include an index table similar to index table 100.

Figure 2:
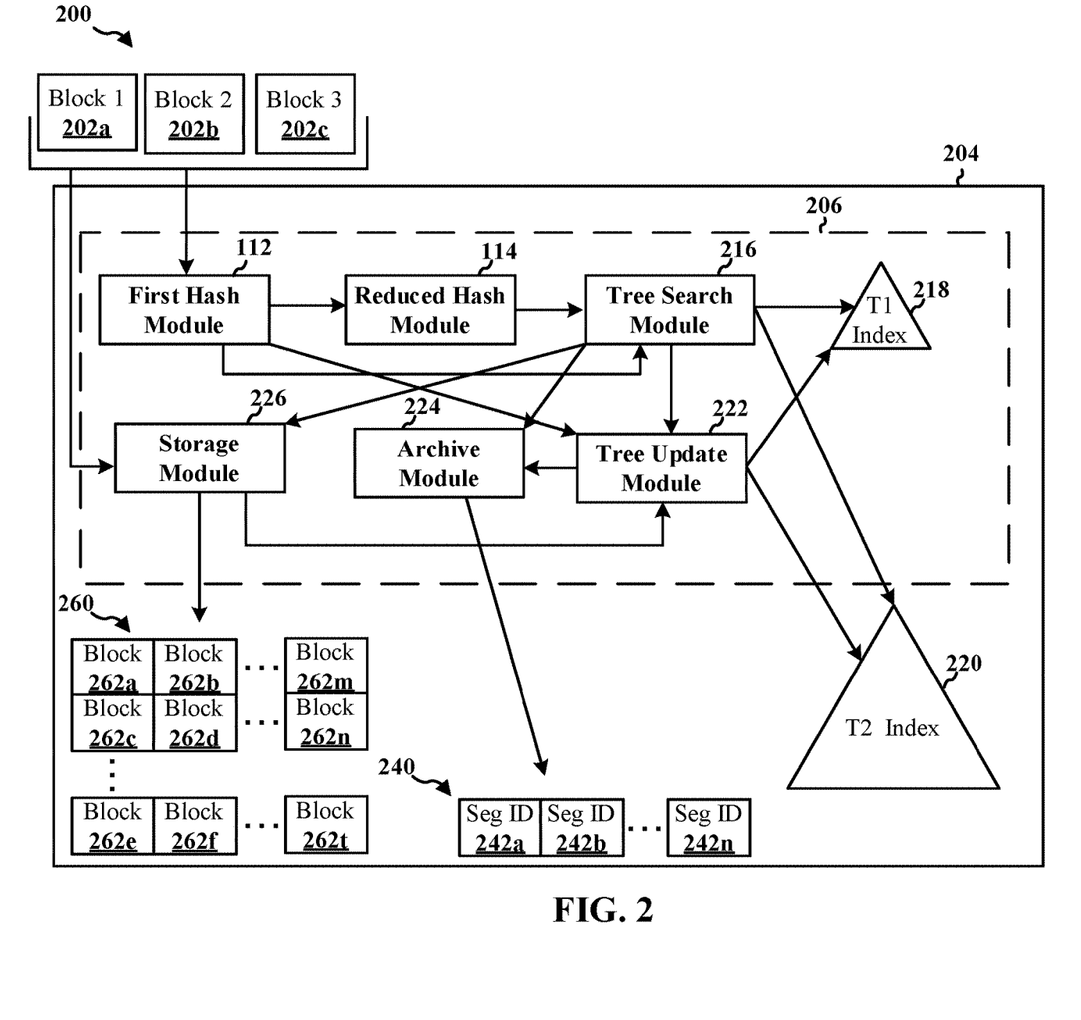
FIG. 2 is a block diagram illustrating an exemplary system for data deduplication during a backup using at least two LSM trees.

FIG. 2 depicts a diagram 200 of an exemplary system 204 for performing data backup and recovery which implement data binning using log-structured merge trees during deduplication. It will be appreciated that while the diagram 200 illustrates a plurality of components, additional components may be included and/or illustrated components may be omitted or combined. Further, connections between various components are intended to be illustrative and different approaches to communication between components may be employed in the system 204. While the system 204 is described in the context of a backup operation, other implementations are comprehended herein (e.g., data caching using the system 204 may increase the speed of working with data).

As shown, the backup system 204 may include volatile memory 206, which may be random-access memory (RAM). The backup system 204 may further include a segment store 260, which may store a plurality of data blocks 262. The segment store 260 may be persistent storage and may include any suitable storage medium, such as hard disk drive (HDD), magnetic tape, and/or the like. The backup system 204 may further include an archive 240. The archive 240 may include a plurality of segment identifiers (IDs) 242. Each segment ID 242 may be a reference to a data block 262 in the segment store 260 (e.g., segment ID 242*a* may reference block 262*a*). The archive 240 may be stored in persistent memory (although not necessarily the same persistent memory as the segment store 260), such as on disk.

The volatile memory 206 may include at least a first LSM tree 218, which may be associated with an index for blocks 262 in the store 260. The system 204 may further include a second LSM tree 220, which also may be associated with an index for blocks 262 in the store 260. In one example aspect, the second LSM tree 220 may be in persistent storage (e.g., on disk, in non-volatile memory) rather than in the volatile memory 206. In one example aspect, the second LSM tree 220 may include a plurality of records, and each record may indicate a mapping from a segment ID 242 to a first hash value and a physical offset (e.g., an offset from a beginning address of a file in the segment store 260 or an offset from a first data block 262*a* in the segment store 260). Similarly, the first LSM tree 218 may include a plurality of records. However, each record in the first LSM tree may indicate a mapping from a reduced hash value to a segment ID 242, and each reduced hash value may be determined from a first hash value in the second LSM tree 220. It is understood that an LSM may comprise an arbitrary number of trees, any number of which may be stored in whole or in part in volatile memory or persistent memory.

In one example aspect, the system 204 includes a plurality of modules 212, 214, 216, 222, 224, 226. Although the plurality of modules 212, 214, 216, 222, 224, 226 are illustrated as within volatile memory 206, one or more of the modules 212, 214, 216, 222, 224, 226 may be implemented as hardware, software, or a combination (e.g., system on a chip) and may be persistently stored.

As shown in FIG. 2, a plurality of blocks 202 are provided to the system 204, for example, in association with a backup operation. In one exemplary aspect, the system 204 may not receive data already divided into blocks 202; rather, the system 204 may receive data to be stored and the system 204 may segment the data into a plurality of blocks 202 (e.g., "chunking"). In one exemplary aspect, the first hash module 212 receives a first block 202*a*. The first hash module 212 may be configured to calculate a first hash value associated with the first data block 202*a*. For example, the first hash module 212 may use a SHA-1 or SHA-256 method to calculate a hash based on a byte pattern of the first block 202*a*. The first hash module 212 may provide the first hash value to a reduced hash module 214. The reduced hash module 214 may be configured to determine a reduced hash value based on the first hash value. The reduced hash value may be smaller in size than the first hash value. In one exemplary aspect, the reduced hash module 214 may select a plurality of bits (e.g., 5) beginning the first hash value as the reduced hash value. In a further exemplary aspect, the reduced hash module may perform the binning operation described herein and optionally also the selection of a representative reduced hash for each bin.

The reduced hash module 214 may perform a binning operation and then provide the representative reduced hash value to a tree search module 216. The tree search module 216 may be configured to search the first LSM tree 218 and the second LSM tree 220. With the representative reduced hash value, the tree search module 216 may determine whether the representative reduced hash value occurs in the first LSM tree 218 (e.g., determine whether the reduced hash value matches a value in an index table of the first LSM tree 218). In one example aspect, the reduced hash value may occur a plurality of times in the first LSM tree 218. As the first LSM tree 218 indicates mappings between reduced hash values and segment IDs 242, the tree search module 216 may identify one or more segment IDs, each of which corresponds to a value in the first LSM tree 218 that matches the reduced hash value.

When the representative reduced hash value does occur in the first LSM tree 218, the reduced hashes of other blocks in the same bin as the representative reduced hash may then be loaded into memory, and the tree search module 216 may then search the second LSM tree 220 to determine if the representative reduced hash and/or any of the additional reduced hashes in the same bin occur in the second LSM tree 220. For example, the tree search module 216 may compare the representative reduced hash value to one or more hash values in the second LSM tree 220 to identify a matching hash value. As the first LSM tree 218 is populated using reduced hash values corresponding to full hash values included in the second LSM tree 220, the tree search module 216 will generally identify at least one hash value in the second LSM tree 220 that matches the first hash value. In one example aspect, the tree search module 216 may use the one or more segment IDs identified from the first LSM tree 218 to select one or more full hash values in the second LSM tree 220. The tree search module 216 may compare the first hash value to the one or more selected full hash values to identify the matching hash value.

From the matching hash value, the tree search module 216 may identify a record indicating a mapping from segment ID to the first hash value and the physical offset. The tree search module 216 may provide this information to an archive module 224. For the first data block 202a, the archive module 224 may write, in the archive 240, the segment ID corresponding to the matching hash value, for example, as a second segment ID 242b. Accordingly, the first data block 202a may be referenced by a pointer that indicates the first data block 202a corresponds to the segment ID 242b referencing the existing data block 262b in the segment store 260.

When the representative reduced hash value does not occur in the first LSM tree 218, the tree search module 216 may indicate to a storage module 226 that the first data block 202a associated with the representative reduced hash is unique and therefore should be added to the segment store 260, in addition to the plurality of data blocks associated with the reduced hash values that are in the same bin as the representative reduced hash. The storage module 226 may write the first data block 202a to the segment store 260—e.g., the first block 202a may be written as block 262t in the segment store 260. Based on the newly added block 262t, the storage module 226 may determine an offset for the block 262t, such as an offset from a beginning physical address of the block 262t in the segment store 260 or an offset from a beginning block 262a in the segment store 260. The storage module 226 may provide this offset to a tree update module 222.

The tree update module 222 may be generate a segment ID in association with the newly added block 262t. The tree update module 222 may add a record to the second LSM tree 220 that indicates a mapping from the segment ID to the first hash value and the physical offset. Further, the tree update module 222 may add a record to the first LSM tree 218 that indicates a mapping from the representative reduced hash value to the segment ID. Accordingly, the tree search module 216 may quickly search to determine whether a next block 202b matches the newly added block 262t. A similar process as described with respect to first block 202a may then be repeated for all remaining blocks 202b, 202c during a backup operation.

In one example aspect, the tree update module 222 may generate a segment added for the newly added block 262t by incrementing a previous segment ID (e.g., the segment ID of a unique data block 262n added to the segment store 260 immediately before the newly added block 262t). Thus, the segment IDs may be sequential and may reflect the order in which blocks 202 are added during backup. Thus, when reading large files (e.g., video), which consist of the blocks 262, the time required to identify duplicate data may be reduced by data locality—that is, adjacent blocks (e.g., block 262a and block 262b) may have sequential segment IDs (e.g., segment ID 242a and segment ID 242b).

Figure 3:
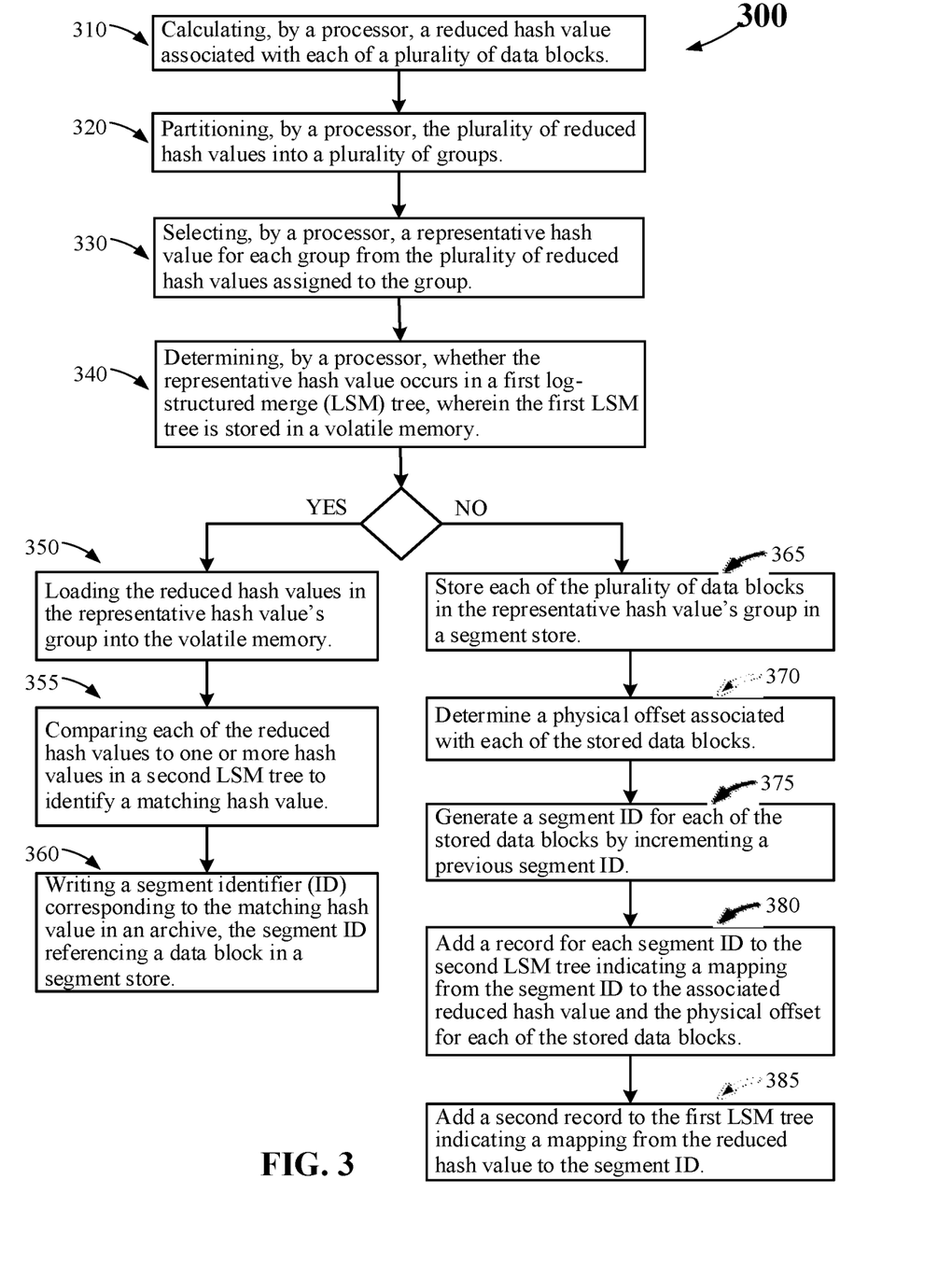
FIG. 3 is a flowchart illustrating a method for data backup using deduplication and data binning according to an exemplary aspect of the disclosure.

FIG. 3 depicts an exemplary method for performing data backup and recovery which implement data binning using log-structured merge trees during deduplication. The method 300 may be implemented by the system 200 shown in FIG. 2. In the exemplary method illustrated by this figure, at step 310, the system 200 calculates, for each of a plurality of data blocks, a reduced hash value associated with each of the data blocks. In another aspect, which are not shown in this figure, this reduced hash calculation is optional and an initial or otherwise non-reduced hash may be used. At step 320, the system partitions partitioning the plurality of reduced hash values into groups. At step 330, the system selects a representative hash value for each group. At step 340, the system determines whether the representative hash value occurs in a first log-structured merge (LSM) tree, the first LSM tree stored in a volatile memory. At this stage, based on the determination in step 340, the pathway bifurcate. If the representative reduced hash is found to occur in the first LSM, then at step 350 the reduced hash values in the representative hash value's group are loaded into the volatile memory, and at step 355 each of the reduced hash values is compared to one or more hash values in a second LSM tree to identify a matching hash value. When matching hash value is identified, at step 360 a segment identifier (ID) corresponding to the matching hash value in the archive is written, the segment ID referencing a data block in a segment store. Alternatively, if the representative reduced hash is not found to occur in the first LSM, at step 365, each of the plurality of data blocks is stored in a segment store, and at step 370 a physical offset is determined for each of the stored data blocks. At step 375, a segment ID is generated for each of the stored data blocks by incrementing a previous segment ID. Finally, at step 380, a record for each segment ID is added to the second LSM tree indicating a mapping of the segment ID to the reduced hash value and the physical offset for each of the stored data blocks.

In one example aspect, the system may be implemented using a plurality of LSM trees, associated with data deduplication. The LSM trees have the property of "displacement" of older data—that is, when a threshold is reached, older records from one level of an LSM tree are moved to a lower level of the LSM tree. For example, when a threshold amount of records is reached in a given level, one or more older records may be moved to the next level of the LSM tree. In one example aspect, this threshold, as well as other coefficients associated with the deduplication process may be adjusted to increase efficiency. In one example aspect, only those LSM trees that are placed in volatile memory may be searched. Aspects described herein may be used in combination with a bloom filter algorithm in order to improve searches on index tables (e.g., lookup tables). Further, aspects described herein may be used in connection with optimizing compact data placement in a storage (e.g., data compacting) and/or together with stream binning technology.

Figure 4:
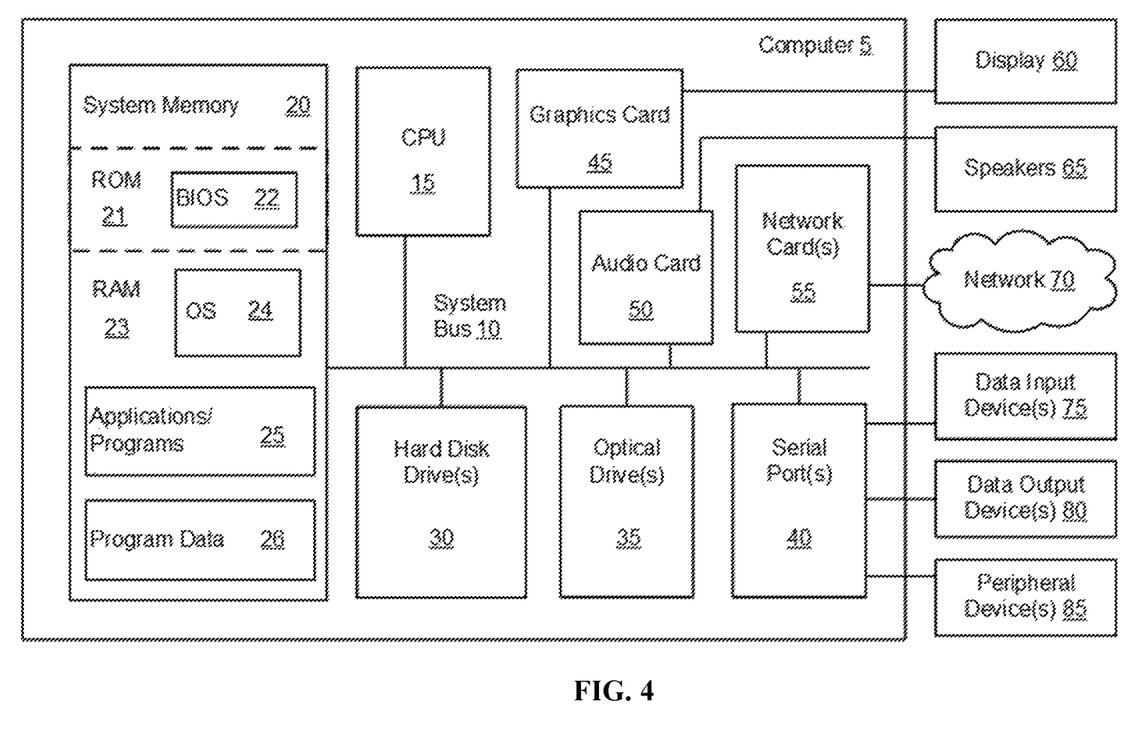
FIG. 4 is a block diagram illustrating an example general-purpose computer system on which the systems and methods of the present invention may be implemented.

FIG. 4 is a block diagram depicting an exemplary aspect of a computer system 5 that may be used to implement the disclosed system and method for performing data backup. The computer system 5 may include, but not limited to, a personal computer, a notebook, tablet computer, a smart phone, a mobile device, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the modules of computer system 5, such as during start-up. RAM 23 stores operating system 24 (OS), such as Windows® 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In one example aspect, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

The terms "component" and "module" as used herein mean a real-world device, apparatus, or arrangement of components or modules implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A component or module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 4 above). Accordingly, each component or module can be realized in a variety of suitable configurations, and should not be limited to any particular implementation exemplified herein.

In the interest of clarity, not all of the routine features of the aspects are disclosed herein. It will be appreciated that in the development of any actual implementation of the disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The one example aspect disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for data backup, comprising:
   calculating, by a processor, a reduced hash value associated with each of a plurality of data blocks;
   partitioning, by the processor, the plurality of reduced hash values into groups;
   selecting, by the processor, a representative hash value for each group;
   determining, by the processor, whether the representative hash value occurs in a first log-structured merge (LSM) tree, the first LSM tree stored in a volatile memory; and
   when the representative hash value occurs in the first LSM tree:
      loading the reduced hash values in the representative hash value's group into the volatile memory;
      comparing each of the reduced hash values to one or more hash values in a second LSM tree to identify a matching hash value; and
      writing a segment identifier (ID) corresponding to the matching hash value in an archive, the segment ID referencing a data block in a segment store.

2. The method of claim 1, wherein the representative hash value for each group is selected from the plurality of reduced hash values assigned to the group.

3. The method of claim 1, wherein the segment ID is generated by incrementing a previous segment ID.

4. The method of claim 1, further comprising:
   identifying the segment ID based on the determination that the representative hash value occurs in the first LSM tree,
   wherein the one or more reduced hash values in the second LSM tree are each associated with the segment ID.

5. The method of claim 1, wherein calculating the reduced hash value comprises selecting a plurality of bits at a beginning of a first hash value as the reduced hash value.

6. The method of claim 1, wherein the second LSM tree is stored in non-volatile memory.

7. The method of claim 1, further comprising:
   when the representative hash value does not occur in the first LSM tree, storing each of the plurality of data blocks in the representative hash value's group in the segment store.

8. A system for data backup, comprising:
   one or more hardware or virtual processors configured to:
   calculate, for each of a plurality of data blocks, a reduced hash value associated with each of the data blocks;
   partition, by the processor, the plurality of reduced hash values into groups;
   select, by the processor, a representative hash value for each group;
   determine, by the processor, whether the representative hash value occurs in a first log-structured merge (LSM) tree, the first LSM tree stored in a volatile memory; and
   when the representative hash value occurs in the first LSM tree:
      load the reduced hash values in the representative hash value's group into the volatile memory;
      compare each of the reduced hash values to one or more hash values in a second LSM tree to identify a matching hash value; and
      write a segment identifier (ID) corresponding to the matching hash value in an archive, the segment ID referencing a data block in a segment store.

9. The system of claim 8, wherein the representative hash value for each group is selected from the plurality of reduced hash values assigned to the group.

10. The system of claim 8, wherein the segment ID is generated by incrementing a previous segment ID.

11. The system of claim 8, wherein the processor is further configured to:
    identify the segment ID based on the determination that the representative hash value occurs in the first LSM tree,
    wherein the one or more reduced hash values in the second LSM tree are each associated with the segment ID.

12. The system of claim 8, wherein calculating the reduced hash value comprises selecting a plurality of bits at a beginning of a first hash value as the reduced hash value.

13. The system of claim 8, wherein the second LSM tree is stored in non-volatile memory.

14. The system of claim 8, wherein the processor is further configured to:
    when the representative hash value does not occur in the first LSM tree, store each of the plurality of data blocks in the representative hash value's group in the segment store.

15. A non-transitory computer readable medium comprising computer executable instructions for data backup, including instructions for:
    calculating, for each of a plurality of data blocks, a reduced hash value associated with each of the data blocks;
    partitioning, by the processor, the plurality of reduced hash values into groups;
    selecting, by the processor, a representative hash value for each group;
    determining, by the processor, whether the representative hash value occurs in a first log-structured merge (LSM) tree, the first LSM tree stored in a volatile memory; and
    when the representative hash value occurs in the first LSM tree:
       loading the reduced hash values in the representative hash value's group into the volatile memory;
       comparing each of the reduced hash values to one or more hash values in a second LSM tree to identify a matching hash value; and
       writing a segment identifier (ID) corresponding to the matching hash value in an archive, the segment ID referencing a data block in a segment store.

16. The non-transitory computer readable medium of claim 15, wherein the representative hash value for each group is selected from the plurality of reduced hash values assigned to the group.

17. The non-transitory computer readable medium of claim 15, wherein the segment ID is generated by incrementing a previous segment ID.

18. The non-transitory computer readable medium of claim 15, further comprising instructions for:
    identifying the segment ID based on the determination that the representative hash value occurs in the first LSM tree,
    wherein the one or more reduced hash values in the second LSM tree are each associated with the segment ID.

19. The non-transitory computer readable medium of claim 15, wherein calculating the reduced hash value comprises selecting a plurality of bits at a beginning of a first hash value as the reduced hash value.

20. The non-transitory computer readable medium of claim 15, wherein the second LSM tree is stored in non-volatile memory.

\* \* \* \* \*